United States Patent [19]

Lund et al.

[11] Patent Number: 5,759,438

[45] Date of Patent: Jun. 2, 1998

[54] AZEOTROPE-LIKE COMPOSITIONS OF 1,1,1,3,3-PENTAFLUOROPROPANE AND 1,1-DICHLORO-1-FLUOROETHANE

[75] Inventors: Earl August Eugene Lund, West Seneca; Robert Christian Parker, Hamburg; Ian Robert Shankland, Williamsville; Gary Michael Knopeck, Lakeview, all of N.Y.

[73] Assignee: AlliedSignal Inc., Morristown, N.J.

[21] Appl. No.: 888,712

[22] Filed: Jul. 7, 1997

Related U.S. Application Data

[62] Division of Ser. No. 678,209, Jul. 11, 1996, Pat. No. 5,688,833.

[51] Int. Cl.$^6$ ............................... C08J 9/14; C08G 18/00
[52] U.S. Cl. ..................... 252/182.24; 510/415; 521/98; 521/131
[58] Field of Search ............... 252/182.24; 510/415; 521/98, 131

[56] References Cited

U.S. PATENT DOCUMENTS

| | | | |
|---|---|---|---|
| 4,945,119 | 7/1990 | Smits et al. | 521/131 |
| 5,308,881 | 5/1994 | Londrigan et al. | 521/112 |
| 5,563,180 | 10/1996 | Skowronski et al. | 521/129 |

*Primary Examiner*—Morton Foelak
*Attorney, Agent, or Firm*—Jay P. Friedenson

[57] ABSTRACT

Azeotrope-like compositions of 1,1,1,3,3-pentafluoropropane and 1,1-dichloro-1-fluoroethane are provided. The compositions of the invention are useful in the preparation of polyurethane and polyisocyanurate foams and as aerosol propellants.

3 Claims, No Drawings

AZEOTROPE-LIKE COMPOSITIONS OF 1,1,1,3,3-PENTAFLUOROPROPANE AND 1,1-DICHLORO-1-FLUOROETHANE

This application is a division of application Ser. No. 08/678,209, filed Jul. 11, 1996, now U.S. Pat. No. 5,688,833.

FIELD OF THE INVENTION

This invention relates to azeotrope-like compositions of 1,1,1,3,3-pentafluoropropane and 1,1-dichloro-1-fluoroethane. The compositions of the invention are useful as blowing agents in the manufacture of rigid and flexible polyurethane foams and polyisocyanurate foams, as solvents, and as aerosol propellants.

BACKGROUND OF THE INVENTION

Rigid polyurethane and polyisocyanurate foams are manufactured by reacting and foaming a mixture of ingredients, in general an organic polyisocyanate with a polyol or mixture of polyols, in the presence of a volatile liquid blowing agent. The blowing agent is vaporized by the heat liberated during the reaction of isocyanate and polyol causing the polymerizing mixture to foam. This reaction and foaming process may be enhanced through the use of various additives such as amine or tin catalysts and surfactant materials that serve to control and adjust cell size and to stabilize the foam structure during formation. Foams made with blowing agents such as $CCl_3F$ ("CFC-11") and $CCl_2FCH_3$, 1,1,-dichloro-1-fluoroethane ("HCFC-141b") offer excellent thermal insulation, due in part to the very low thermal conductivity of CFC-11 and HCFC-141b vapor, and are used widely in insulation applications.

Flexible polyurethane foams are generally open-cell foams manufactured using an excess of diisocyanate that reacts with water, also included as a raw material, producing gaseous carbon dioxide and causing foam expansion. The flexible foams are widely used as cushioning materials in items such as furniture, bedding, and automobile seats. Auxiliary physical blowing agents such as methylene chloride and/or CFC-11 are required in addition to the water/diisocyanate blowing mechanism in order to produce low density, soft grades of foam.

Many foam producers have converted from chlorofluorocarbon ("CFC") blowing agents, such as CFC-11, to environmentally safer hydrochlorofluorocarbon ("HCFC") agents and hydrocarbons. However, HCFCs, such as HCFC-141b, also have some propensity to deplete stratospheric ozone albeit significantly less than that of the CFCs.

In contrast to the foregoing blowing agents, hydrofluorocarbons ("HFCs") such as 1,1,1,3,3-pentafluoropropane ("HFC-245fa") do not deplete stratospheric ozone. This invention provides azeotrope-like compositions based on HFC-245fa and 141b for use as blowing agents for polyurethane-type foams.

Azeotropic blowing agents possess certain advantages such as more efficient blowing than the individual components, lower thermal conductivity or K-factor, and better compatibility with other foam raw materials. Additionally, azeotropic or azeotrope-like compositions are desirable because they do not fractionate upon boiling or evaporation. This behavior is especially important where one component of the blowing agent is very flammable and the other component is nonflammable because minimizing fractionation during a leak or accidental spill minimizes the risk of producing extremely flammable mixtures.

This invention provides azeotrope-like compositions that are environmentally safe substitutes for CFC and HCFC blowing agents, that have a reduced propensity for photochemical smog production, and that produce rigid and flexible polyurethane foams and polyisocyanurate foams with good properties. Foams made with the blowing agent compositions of this invention exhibit improved properties, such as foam dimensional stability, when compared to foams made with 141b alone.

DETAILED DESCRIPTION OF THE INVENTION

This invention provides azeotrope-like compositions comprising 245fa and 141b that are useful as blowing agents for polyurethane and polyisocyanurate foams. The azeotrope-like compositions of the invention comprise from about 1 to about 50 percent by weight 141 b and from about 99 to about 50 percent by weight HFC-245fa and have a boiling point 14.6°±2° C. at 748 mm Hg. In a preferred embodiment, such azeotrope-like compositions comprise from about 1 to about 30 percent by weight 141b and from about 99 to about 70 percent by weight HFC-245fa and have a boiling point of 14.6°±° C. at 748 mm Hg.

Polyurethane foams expanded with the blowing agents of the invention exhibit superior performance to foams expanded with 141b alone. Improved dimensional stability, especially at low temperature, is also observed.

The azeotrope-like compositions of the invention exhibit low ozone depletion and low global warming potential. Further, the compositions exhibit constant boiling behavior and minimal fractionation on evaporation or condensation.

From fundamental principles, the thermodynamic state of a fluid is defined by four variables: pressure; temperature; liquid composition; and vapor composition. An azeotrope is a unique characteristic of a system of two or more components in which the liquid and vapor compositions are equal at a stated pressure and temperature. In practice this means that the components cannot be separated during a phase change.

All compositions of the invention within the indicated ranges, as well as certain compositions outside the indicated ranges, are azeotrope-like. For the purposes of the invention, by azeotrope-like composition is meant that the composition behaves like a true azeotrope in terms of constant boiling characteristic or tendency not to fractionate upon boiling or evaporation. Thus, in such systems, the composition of the vapor formed during the evaporation is identical, or substantially identical, to the original liquid composition. During boiling or evaporation of azeotrope-like compositions, the liquid composition, if it changes at all, changes only slightly. This is contrasted with non-azeotrope-like compositions in which the liquid and vapor compositions change substantially during evaporation or condensation.

One way to determine whether a candidate mixture is azeotrope-like within the meaning of this invention, is to distill a sample thereof under conditions, i.e., resolution—number of plates, that would be expected to separate the mixture into its separate components. If the mixture is non-azeotropic or non-azeotrope-like, the mixture will fractionate, or separate into its various components, with the lowest boiling component distilling off first, and so on. If the mixture is azeotrope-like, some finite amount of the first distillation cut will be obtained which contains all of the mixture components and which is constant boiling or behaves as a single substance. This phenomenon cannot occur if the mixture is not azeotrope-like, or not part of an azeotropic system.

Another characteristic of azeotrope-like compositions is that there is a range of compositions containing the same components in varying proportions that are azeotrope-like. All such compositions are intended to be covered by the term azeotrope-like as used herein. As an example, it is well known that at different pressures the composition of a given azeotrope will vary at least slightly as does the boiling point of the composition. Thus, an azeotrope of A and B represents a unique type of relationship but with a variable composition depending on the temperature and/or pressure.

In the process embodiments of the invention, the azeotrope-like compositions of the invention may be used in methods for producing a rigid closed-cell polyurethane, a flexible open-cell polyurethane, or polyisocyanurate foam. In respect to the preparation of rigid or flexible polyurethane or polyisocyanurate foams using the azeotrope like compositions described in the invention, any of the methods well known in the art can be employed. See Saunders and Frisch, *Volumes I and II Polyurethanes Chemistry and Technology* (1962). In general, polyurethane or polyisocyanurate foams are prepared by combining an isocyanate, a polyol or mixture of polyols, a blowing agent or mixture of blowing agents, and other materials such as catalysts, surfactants, and optionally, flame retardants, colorants, or other additives.

It is convenient in many applications to provide the components for polyurethane or polyisocyanurate foams in preblended formulations. Most typically, the foam formulation is preblended into two components. The isocyanate, optionally certain surfactants, and blowing agents comprise the first component, commonly referred to as the "A" component. The polyol or polyol mixture, surfactant, catalysts, blowing agents, flame retardant, and other isocyanate reactive components comprise the second component, commonly referred to as the "B" component. Accordingly, polyurethane or polyisocyanurate foams are readily prepared by bringing together the A and B side components either by hand mix, for small preparations, or preferably machine mix techniques to form blocks, slabs, laminates, pour-in-place panels and other items, spray applied foams, froths, and the like. Optionally, other ingredients such as fire retardants, colorants, auxiliary blowing agents, water, and even other polyols can be added as a third stream to the mix head or reaction site. Most conveniently, however, they are all incorporated into one B Component.

Any organic polyisocyanate can be employed in polyurethane or polyisocyanurate foam synthesis inclusive of aliphatic and aromatic polyisocyanates. Preferred as a class are the aromatic polyisocyanates. Preferred polyisocyanates for rigid polyurethane or polyisocyanurate foam synthesis are the polymethylene polyphenyl isocyanates, particularly the mixtures containing from about 30 to about 85 percent by weight of methylenebis(phenyl isocyanate) with the remainder of the mixture comprising the polymethylene polyphenyl polyisocyanates of functionality higher than 2. Preferred polyisocyanates for flexible polyurethane foam synthesis are toluene diisocyantes including, without limitation, 2,4-toluene diisocyanate, 2,6-toluene diisocyanate, and mixtures thereof.

Typical polyols used in the manufacture of rigid polyurethane foams include, but are not limited to, aromatic amino-based polyether polyols such as those based on mixtures of 2,4- and 2,6-toluenediamine condensed with ethylene oxide and/or propylene oxide. These polyols find utility in pour-in-place molded foams. Another example is aromatic alkylamino-based polyether polyols such as those based on ethoxylated and/or propoxylated aminoethylated nonylphenol derivatives. These polyols generally find utility in spray applied polyurethane foams. Another example is sucrose-based polyols such as those based on sucrose derivatives and/or mixtures of sucrose and glycerine derivatives condensed with ethylene oxide and/or propylene oxide. These polyols generally find utility in pour-in-place molded foams.

Typical polyols used in the manufacture of flexible polyurethane foams include, but are not limited to, those based on glycerol, ethylene glycol, trimethylolpropane, ethylene diamine, pentaerythritol, and the like condensed with ethylene oxide, propylene oxide, butylene oxide, and the like. These are generally referred to as "polyether polyols". Another example is the graft copolymer polyols which include, but are not limited to, conventional polyether polyols with vinyl polymer grafted to the polyether polyol chain. Yet another example is polyurea modified polyols which consist of conventional polyether polyols with polyurea particles dispersed in the polyol.

Examples of polyols used in polyurethane modified polyisocyanurate foams include, but are not limited to, aromatic polyester polyols such as those based on complex mixtures of phthalate-type or terephthalate-type esters formed from polyols such as ethylene glycol, diethylene glycol, or propylene glycol. These polyols are used in rigid laminated boardstock, and may be blended with other types of polyols such as sucrose based polyols, and used in polyurethane foam applications.

Catalysts used in the manufacture of polyurethane foams are typically tertiary amines including, but not limited to, N-alkylmorpholines, N-alkylalkanolamines, N,N-dialkylcyclohexylamines, and alkylamines where the alkyl groups are methyl, ethyl, propyl, butyl and the like and isomeric forms thereof, as well as hetrocyclic amines. Typical, but not limiting, examples are triethylenediamine, tetramethylethylenediamine, bis(2-dimethylaminoethyl) ether, triethylamine, tripropylamine, tributylamine, triamylamine, pyridine, quinoline, dimethylpiperazine, piperazine, N,N-dimethylcyclohexylamine, N-ethylmorpholine, 2-methylpiperazine, N,N-dimethylethanolamine, tetramethylpropanediamine, methyltriethylenediamine, and mixtures thereof.

Optionally, non-amine polyurethane catalysts are used. Typical of such catalysts are organometallic compounds of lead, tin, titanium, antimony, cobalt, aluminum, mercury, zinc, nickel, copper, manganese, zirconium, and mixtures thereof. Exemplary catalysts include, without limitation, lead 2-ethylhexoate, lead benzoate, ferric chloride, antimony trichloride, and antimony glycolate. A preferred organo-tin class includes the stannous salts of carboxylic acids such as stannous octoate, stannous 2-ethylhexoate, stannous laurate, and the like, as well as dialkyl tin salts of carboxylic acids such as dibutyl tin diacetate, dibutyl tin dilaurate, dioctyl tin diacetate, and the like.

In the preparation of polyisocyanurate foams, trimerization catalysts are used for the purpose of converting the blends in conjunction with excess A component to polyisocyanurate-polyurethane foams. The trimerization catalysts employed can be any catalyst known to one skilled in the art including, but not limited to, glycine salts and tertiary amine trimerization catalysts, alkali metal carboxylic acid salts, and mixtures thereof. Preferred species within the classes are potassium acetate, potassium octoate, and N-(2-hydroxy-5-nonylphenol)methyl-N-methylglycinate.

Dispersing agents, cell stabilizers, and surfactants may be incorporated into the present blends. Surfactants, better known as silicone oils, are added to serve as cell stabilizers. Some representative materials are sold under the names of DC-193, B- 8404, and L-5340 which are, generally, polysiloxane polyoxyalkylene block co-polymers such as those disclosed in U.S. Pat. Nos. 2,834,748, 2,917,480, and 2,846,458.

Other optional additives for the blends may include flame retardants such as tris(2-chloroethyl)phosphate, tris(2-chloropropyl)phosphate, tris(2,3-dibromopropyl)phosphate, tris(1,3-dichloropropyl)phosphate, diammonium phosphate, various halogenated aromatic compounds, antimony oxide, aluminum trihydrate, polyvinyl chloride, and the like. Other optional ingredients may include from 0 to about 3 percent water, which chemically reacts with the isocyanate to produce carbon dioxide. The carbon dioxide acts as an auxiliary blowing agent.

Also included in the mixture are blowing agents or blowing agent blends as disclosed in this invention. Generally speaking, the amount of blowing agent present in the blended mixture is dictated by the desired foam densities of the final polyurethane or polyisocyanurate foams products. The proportions in parts by weight of the total blowing agent blend can fall within the range of from 1 to about 45 parts of blowing agent per 100 parts of polyol, preferably from about 4 to about 30 parts.

The polyurethane foams produced can vary in density from about 0.5 pound per cubic foot to about 40 pounds per cubic foot, preferably from about 1.0 to about 20.0 pounds per cubic foot, and most preferably from about 1.5 to about 6.0 pounds per cubic foot for rigid polyurethane foams and from about 1.0 to about 4.0 pounds per cubic foot for flexible foams. The density obtained is a function of how much of the blowing agent, or blowing agent mixture, of the invention is present in the A and/or B components, or that is added at the time the foam is prepared.

The HFC-245fa component of the novel azeotrope-like compositions of the invention is a known material and can be prepared by methods known in the art such as those disclosed in WO 94/14736, WO 94/29251, WO 94/29252. The 141b component is commercially available.

In another embodiment, the compositions of the invention may be used in a method for producing foam comprising blending a heat plasticized resin with a volatile blowing agent comprising the azeotrope-like compositions of the invention and introducing the resin/blowing agent blend into a zone of lower pressure to cause foaming. In yet another embodiment, the azeotrope-like compositions of the invention may be used in a premix of polyol and blowing agent, which blowing agent comprises the azeotrope-like compositions of the invention.

In another embodiment of the invention, the azeotrope-like compositions of the invention are used as solvents in a variety of vapor degreasing, cold cleaning, and solvent cleaning applications, including defluxing. In particular, the compositions of the invention may be used to clean solid surfaces by treating the solid surfaces with the compositions in any manner well known in the art such as dipping, spraying, or using conventional degreasing apparatuses. When the compositions of the invention are used to clean solid surfaces by spraying the surface with the composition, preferably the azeotrope-like compositions are sprayed onto the surfaces by using a propellant. Preferably, the propellant is selected from hydrocarbons, chlorofluorocarbons, hydrochlorofluorocarbons, dimethyl ether, carbon dioxide, nitrogen, nitrous oxide, methylene oxide, air, or mixtures thereof. More preferably, the propellant is a hydrochlorofluorocarbon, a hydrofluorocarbon, or a mixture thereof.

In yet another embodiment, the azeotrope-like compositions of the invention may be used as solvents and propellants in aerosol systems. Typically, aerosol compositions contain one or more propellants along with one or more active ingredients, inert ingredients, or solvents.

This invention is further illustrated by the following non-limiting examples in which parts or percentages are by weight unless otherwise specified.

EXAMPLE 1

This example shows that a minimum boiling azeotrope forms between HFC-245fa and 141 b. The example also shows that these mixtures exhibit azeotrope-like or constant boiling behavior over a range of compositions.

Boiling point measurements were performed using an ebulliometric technique similar to that described by W. Swietoslawski in *Ebulliometric Measurements*, Reinhold Publishing Corp. (1945). The ebulliometer was first charged with a weighed amount of HFC-245fa. The system was brought to total reflux by gently heating the lower part of the ebulliometer. The temperature of the boiling liquid was measured, with reference to pure 245fa, using a matched pair of thermistors, precise to ±0.01° C. Boiling temperature and atmospheric pressure were recorded after steady-state had been attained. An aliquot of 141b was then added volumetrically to the sample side of the ebulliometer and the boiling temperature and atmospheric pressure recorded after the new steady-state had been achieved. This process was repeated with additional aliquots of 141b.

The following Table I summarizes the boiling point measurements for various mixtures of HFC-245fa and 141b. The data summarized in Table I indicate a minimum in the boiling point versus composition curve for HFC-245fa and 141b indicate that these two components form a positive azeotrope. The data also indicate that constant-boiling or azeotrope-like mixtures are formed over a range of compositions of these two components. The boiling point at 748 mm Hg pressure is constant within 2° C. from about 1 to about 42 weight percent 141b and from about 99 to about 58 weight percent HFC-245fa. The boiling point is constant within 1° C. from about 1 to about 30 weight percent 141b and from about 99 to about 70 weight percent HFC-245fa.

TABLE I

| HFC-245fa/141b Boiling Point Data | | |
|---|---|---|
| Weight Percent HFC-245fa | Weight Percent 141b | Boiling Point (°C.) at 748 mm Hg |
| 100.0 | 0.0 | 14.6 |
| 99.1 | 0.9 | 14.69 |
| 98.2 | 1.8 | 14.60 |
| 97.3 | 2.7 | 14.50 |
| 96.4 | 3.6 | 14.50 |
| 95.8 | 4.2 | 14.50 |
| 94.7 | 5.3 | 14.50 |
| 93.9 | 6.1 | 14.50 |
| 93.1 | 6.9 | 14.50 |
| 92.3 | 7.7 | 14.50 |
| 91.5 | 8.5 | 14.50 |
| 90.8 | 9.2 | 14.50 |
| 90.0 | 10.0 | 14.50 |
| 89.3 | 10.7 | 14.50 |
| 88.5 | 11.5 | 14.50 |
| 87.1 | 12.9 | 14.6 |
| 85.7 | 14.3 | 14.6 |
| 84.4 | 15.6 | 14.7 |
| 81.8 | 16.2 | 14.8 |
| 77.1 | 22.9 | 15.0 |
| 73.0 | 27.0 | 15.3 |
| 68.4 | 31.6 | 15.7 |
| 64.3 | 35.7 | 16.0 |
| 61.7 | 39.3 | 16.2 |
| 57.4 | 42.6 | 16.5 |

EXAMPLE 2

This example shows that foams prepared using the azeotrope-like compositions described in this invention as the foam blowing agent exhibit improved dimensional stability compared to foams prepared using only 141b as the foam blowing agent. The general formulation used to prepare these foams is described in Table II.

TABLE II

|  | Parts By Weight |
| --- | --- |
| B-Component (blended polyol) |  |
| Voranol[1] | 70 |
| Tegostab B 8462[2] | 2.0 |
| Terol 375[3] | 30 |
| Blowing Agent or Blowing Agent Blend | Varied |
| Polycat 5[4] | 0.85 |
| Polycat 4[4] | 0.60 |
| A-Component (Isocyanate) |  |
| Luprinate M-20S[5] (110 Index) | 113 |

[1]A sucrose-based polyol from Dow Chemical Co., Midland, Michigan; hydroxyl number = 470.
[2]An aromatic polyester polyol from Oxid, Inc.; hydroxyl number = 360.
[3]A silicone surfactant from Goldschmidt Chemical Co., Hopewell, Virginia.
[4]Tertiary amines from Air Products and Chemical, Inc. Allentown, Pennsylvania.
[5]A polymethylene poly(phenyl isocyanate) mixture containing about 40% by weight of methylenebis(phenylisocyanate) with the balance being polymethylene poly(phenyl isocyanate) having a functionality greater than 2; isocyanate equivalent weight = about 134; from BASF Corp., Wyandotte, Michigan.

The same general procedure, commonly referred to as "hand mixing" was used to prepare all foams. For each blowing agent or blowing agent pair, a premix of polyol, surfactant, catalysts, and water was prepared in the same proportions as displayed in Table II. About 2.0 kg was blended to insure that all of the foams in a given series were made with the same master batch of premix. The premix was blended in a one-gallon paint can, and stirred at about 1500 rpm with a Conn 2" diameter ITC mixer until a homogeneous blend was achieved. When mixing was complete, the material was transferred to a one-gallon glass bottle and sealed. The bottle was then placed in a refrigerator controlled at 50° F. The foam blowing agents were kept separately in the same refrigerator, along with the 32-oz. tin cans used for mixing vessels. The A-component, isocyanate, was kept in sealed containers at 50° F.

For the individual foam preparations, i.e., molded panels, polyol preblend and blowing agents were added to the mixing vessel and stirred as above for about five minutes. The weights of the components were adjusted to give a free-rise foam density of 1.30–1.35 lb/ft³ and a molded panel with a density of 2.00±0.5 lb/ft³ allowing for hold up in the mixing vessel. After this five minute stirring, the mixing container was weighed and any lost blowing agent replaced the mixing vessel and its contents were placed in a refrigerator controlled at 50° F.

After the contents have cooled again to 50° F., approximately 10 minutes, the mixing vessel and pre-weighed isocyanate were removed from the refrigerator and taken to the mixing station. The isocyanate was added quickly to the B-component, the ingredients mixed for 10 seconds at 3000 rpm with the mixer described above. The ingredients were poured into an aluminum mold, temperature 112°–115° F., with 15 inch×13 inch×2.5 inch dimensions and allowed to rise along the 15 inch dimension. The liquid was poured through a 1 inch hole located on the top, slightly offset from the center. The hole was plugged when the foam rises to the hole. The foam was allowed to become firm, about 2 minutes, and then the mold was placed in an oven kept at 120° F. After a 10 minute cure, the mold was removed from the oven and the panel removed from the mold. The panel was weighed and its density determined. Panels not meeting the overall density criterion of 2.00±0.5 lb/ft³ were discarded and repaired making adjustments to the weights of the liquid components as necessary.

After ensuring that meet the density specifications were met, the foams panels were conditioned and tested according to ASTM procedures. The results, are shown in Table III.

TABLE III

| % 245fa in blowing agent blend | % 141b in blowing agent blend | % blowing agent in formulation | Foam density lb/ft³ (ASTM D-1622) | Dimensional stability; −20° C.; 28 days; % vol. change (ASTM D-2126) | Dimensional stability; 70° C.; 28 days; % vol. change (ASTM D-2126) | Dimensional stability; 70° C. and 98% RH; 28 days; % vol. change (ASTM D-2126) |
| --- | --- | --- | --- | --- | --- | --- |
| 0 | 100 | 18.9 | 2.02 | not measured[1] | 5.86 | 21.5 |
| 20 | 80 | 19.1 | 1.98 | −1.64 | 3.55 | 17.7 |
| 40 | 60 | 19.4 | 1.99 | −1.33 | 3.34 | 16.5 |
| 50 | 50 | 19.5 | 1.99 | −1.64 | 3.44 | 16.3 |
| 60 | 40 | 19.6 | 1.98 | −0.48 | 2.95 | 13.9 |
| 70 | 30 | 19.8 | 1.99 | −0.36 | 2.87 | 10.4 |
| 80 | 20 | 20.0 | 1.99 | −0.36 | 2.44 | 7.42 |
| 100 | 0 | 20.2 | 2.02 | −0.47 | 1.89 | 2.39 |

[1]Sample shrank visibly after only 24 hours. Estimate of shrinkage in volume, approximately 20 percent.

In the example it can be seen that by using the azeotrope-like blend of HFC-245fa and 141b as the foam blowing agent instead of only 141b, dimensional stability is dramatically improved. The foam blown solely with 141b exhibited excessive shrinkage of about 20–25% after only 24 hours at −20° C. Foams blown with the compositions of the invention shrank less than 2% after 28 days at −20° C. In addition, dimensional stability of the foams blown with the compositions of the invention tested at 70° C. and 70° C. and 98% relative humidity were better than that of the respective foams blown only with 141 b. For foam tested at 70° C. for 28 days, percent volume change for the blown foams was less than 3.5% compared to about 5.9% or the foams blown with 141b alone. The results of the humidity aging tests were similar. Percent volume change for the foam blown with only 141 b tested after 28 days at 70° C. and 98% RH was 21.5, compared to 16.5% or less for the 245fa/141b composition blown foam.

EXAMPLE 3

Performance studies are conducted to evaluate the solvent properties of the azeotrope-like compositions of the invention. Specifically, metal coupons are cleaned using the azeotrope-like compositions of Example 1 as solvents. The metal coupons are soiled with various types of oils and heated to 93° C. so as to partially simulate the temperature attained while machining and grinding in the presence of these oils. The metal coupons are degreased in a simulated vapor phase degreaser. Condenser coils are kept around the lip of a cylindrical vessel to condense the solvent vapor which then collects in the vessel. The metal coupons are held in the solvent vapor and rinsed for a period of 15 seconds to 2 minutes depending on the oils selected.

The cleaning performance of the azeotrope-like compositions is determined by visual observation and by measuring the weight change of the coupons using an analytical balance to determine the total residual materials left after cleaning. The results indicate that the composition of the invention are effective solvents.

What is claimed is:

1. A premix of a polyol and a blowing agent comprising an azeotrope-like composition consisting essentially of 1,1,1,3,3-pentafluoropropane and 1,1-dichloro-1-fluoroethane.

2. A premix of a polyol and a blowing agent of claim 1, wherein the 1,1,1,3,3-pentafluoropropane is present in an amount from about 99 to about 50 weight percent and the 1,1-dichloro-1-fluoroethane is present in an amount from about 1 to about 50 weight percent.

3. A premix of a polyol and blowing agent of claim 1, wherein the 1,1,1,3,3-pentafluoropropane is present in an amount of from about 99 to 70 weight percent and the 1,1-dichloro-1-fluoroethane is present in an amount of from about 1 to about 30 weight percent.

* * * * *

UNITED STATES PATENT AND TRADEMARK OFFICE
CERTIFICATE OF CORRRECTION

PATENT NO. : 5,759,438
DATED : June 2, 1998
INVENTOR(S) : Earl August Eugene Lund, et al.

It is certified that error appears in the above-identified patent and that said Letters Patent is hereby corrected as shown below:

On the title page, under item [56], add the following:

FOREIGN PATENT DOCUMENTS

| | | DOCUMENT NUMBER | | | | | | PUBLICATION DATE | COUNTRY OR PATENT OFFICE | CLASS | SUBCLASS | TRANSLATION | |
|---|---|---|---|---|---|---|---|---|---|---|---|---|---|
| | | | | | | | | | | | | YES | NO |
| | EP | 0 | 72 | 62 | 8 | 1 | A2 | 9/2/96 | EPC | | | | |
| | WO | 97/ | 1 | 1 | 9 | 9 | 0 | 9/25/96 | PCT | | | | |
| | | | | | | | | | | | | | |

Signed and Sealed this

Thirteenth Day of April, 1999

*Attest:*

Q. TODD DICKINSON

*Attesting Officer*     Acting Commissioner of Patents and Trademarks

UNITED STATES PATENT AND TRADEMARK OFFICE
CERTIFICATE OF CORRECTION

PATENT NO : 5,759,438
DATED : June 2, 1998
INVENTOR(S) : Lund et al.

It is certified that error appears in the above-identified patent and that said Letters Patent is hereby corrected as shown below:

Column 2, line 21, after "±", insert -- 1 --.

Column 8, line 58, delete "or" and substitute -- for -- therefor.

Claim 3, line 1, after "and", insert -- a --.

Signed and Sealed this

Eighth Day of February, 2000

Attest:

Attesting Officer

Q. TODD DICKINSON

Commissioner of Patents and Trademarks